United States Patent
Spath et al.

(10) Patent No.: US 9,623,849 B2
(45) Date of Patent: Apr. 18, 2017

(54) METHOD, SYSTEM AND CONTROLLER FOR DETERMINING WHETHER TO BRAKE A TRAILER

(71) Applicant: Bendix Commercial Vehicle Systems LLC, Elyria, OH (US)

(72) Inventors: Timothy T Spath, Lakewood, OH (US); Thomas S. Miller, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 122 days.

(21) Appl. No.: 14/556,621

(22) Filed: Dec. 1, 2014

(65) Prior Publication Data

US 2016/0152216 A1    Jun. 2, 2016

(51) Int. Cl.
*B60T 8/17*    (2006.01)
*B60T 8/171*   (2006.01)
(Continued)

(52) U.S. Cl.
CPC ............ *B60T 8/1708* (2013.01); *B60T 8/171* (2013.01); *B60T 8/172* (2013.01); *B60T 8/323* (2013.01);
(Continued)

(58) Field of Classification Search
CPC .......... B60T 8/1708; B60T 8/323; B60T 8/17; B60T 8/171; B60T 8/172; B60T 8/88; B60T 8/885; B60T 8/92; B60T 8/94; B60T 7/20; B60T 7/00; B60T 7/042; B60T 7/06; B60T 7/12; B60T 11/108; B60T 13/263;
(Continued)

(56) References Cited

U.S. PATENT DOCUMENTS 3,837,361 A * 9/1974 Urban ................ B60T 8/323
                                                137/627.5
3,880,473 A * 4/1975 Urban ................ B60T 8/323
                                                188/170
(Continued)

FOREIGN PATENT DOCUMENTS

GB        2362693 A  * 11/2001  ............... B60T 7/20
GB   WO 03031855 A1 *  4/2003  ............... B60T 8/362

OTHER PUBLICATIONS

Triodyne, Inc., "Gladhands—An Achilles Heel in Truck Air Brakes," ISSN 1041-9489 Article, Dec. 2002, 3 pages, vol. 22, No. 2, Triodyne, Inc., Niles, Illinois U.S.A.

*Primary Examiner* — Thomas G Black
*Assistant Examiner* — Sara Lewandroski
(74) *Attorney, Agent, or Firm* — Cheryl L. Greenly; Brian E. Kondas; Eugene E. Clair

(57) ABSTRACT

Various embodiments of a method, system and controller for determining whether to actuate the service brakes of a trailer are disclosed. In accordance with one aspect, the controller includes an input for receiving a stop lamp signal from an associated tractor, an input for receiving a control line pressure signal of the trailer, a control output for transmitting a braking control signal and control logic. The method includes receiving a stop lamp signal, receiving a control line pressure signal and determining whether to transmit a braking control signal to the service brakes of the trailer in response to the stop lamp signal being on and the control line pressure signal being less than a pressure threshold.

28 Claims, 3 Drawing Sheets

(51) Int. Cl.
*B60T 8/172* (2006.01)
*B60T 8/32* (2006.01)
*B60T 8/88* (2006.01)
*B60T 7/20* (2006.01)

(52) U.S. Cl.
CPC ............. *B60T 8/885* (2013.01); *B60T 7/20* (2013.01); *B60T 2270/413* (2013.01)

(58) Field of Classification Search
CPC .... B60T 13/265; B60T 13/403; B60T 15/181; B60T 15/182; B60T 15/203; B60T 15/206; B60T 15/223; B60T 15/226; B60T 15/243; B60T 15/246; B60T 2270/08; B60T 2270/40; B60T 2270/402; B60T 2270/403; B60T 2270/404; B60T 2270/413
USPC ........ 701/70, 29.1, 29.2, 33.7, 33.9; 188/3 H
See application file for complete search history.

(56) References Cited

U.S. PATENT DOCUMENTS

| | | | | |
|---|---|---|---|---|
| 3,909,075 A * | 9/1975 | Pittet, Jr. | ............... | B60T 8/323 188/181 A |
| 4,414,630 A * | 11/1983 | Harris | ............... | B60T 8/1708 303/166 |
| 5,042,883 A * | 8/1991 | McCann | ............... | B60T 8/327 303/14 |
| 5,046,786 A * | 9/1991 | Johnston | ............... | B60T 8/263 188/151 A |
| 5,172,958 A * | 12/1992 | Sell | ............... | B60T 13/265 188/170 |
| 5,286,095 A * | 2/1994 | Sell | ............... | B60T 13/265 137/118.06 |
| 5,549,362 A * | 8/1996 | Broome | ............... | B60T 8/00 303/123 |
| 5,615,929 A * | 4/1997 | Broome | ............... | B60T 8/00 303/15 |
| 6,270,168 B1 * | 8/2001 | McCann | ............... | B60T 13/263 303/7 |
| 6,273,522 B1 | 8/2001 | Feetenby et al. | | |
| 6,280,004 B1 * | 8/2001 | Greaves, Jr. | ............... | B60T 7/20 188/3 R |
| 6,354,671 B1 * | 3/2002 | Feldmann | ............... | B60T 7/042 303/15 |
| 6,668,225 B2 | 12/2003 | Oh et al. | | |
| 8,103,414 B2 * | 1/2012 | Boss | ............... | B60K 28/08 180/446 |
| 8,108,118 B2 | 1/2012 | Greene et al. | | |
| 8,249,789 B2 | 8/2012 | Conklin et al. | | |
| 8,540,323 B2 | 9/2013 | Broch et al. | | |
| 9,020,683 B1 * | 4/2015 | Johnson | ............... | B62D 59/00 701/29.1 |
| 2002/0196136 A1 * | 12/2002 | Gagnon | ............... | B60C 23/06 340/438 |
| 2004/0124697 A1 * | 7/2004 | MacGregor | ............... | B60T 17/18 303/89 |
| 2006/0119174 A1 * | 6/2006 | Frashure | ............... | B60T 8/1708 303/127 |
| 2006/0214506 A1 * | 9/2006 | Albright | ............... | B60T 7/20 303/123 |
| 2008/0143179 A1 * | 6/2008 | Rutherford | ............... | B60T 7/20 303/160 |
| 2009/0127042 A1 * | 5/2009 | Sedoni | ............... | B60T 7/20 188/3 H |
| 2010/0066161 A1 | 3/2010 | Fry et al. | | |
| 2010/0070149 A1 | 3/2010 | Fry et al. | | |
| 2010/0085172 A1 | 4/2010 | Ancuta | | |
| 2010/0106385 A1 * | 4/2010 | Ramler | ............... | B60T 13/265 701/70 |
| 2011/0168505 A1 | 7/2011 | Hilberer | | |
| 2012/0330502 A1 | 12/2012 | Greene et al. | | |
| 2013/0085649 A1 * | 4/2013 | Matoy | ............... | B60T 8/1708 701/70 |
| 2014/0149011 A1 * | 5/2014 | Eberling | ............... | B60T 8/1708 701/70 |
| 2014/0200786 A1 | 7/2014 | Morselli et al. | | |
| 2015/0094906 A1 * | 4/2015 | Greene | ............... | B60T 13/263 701/33.9 |
| 2015/0232078 A1 * | 8/2015 | Nagura | ............... | B60T 17/221 701/33.9 |
| 2015/0266459 A1 * | 9/2015 | Gates | ............... | B60T 13/662 701/70 |
| 2016/0137204 A1 * | 5/2016 | Morselli | ............... | B60T 8/175 701/54 |

\* cited by examiner

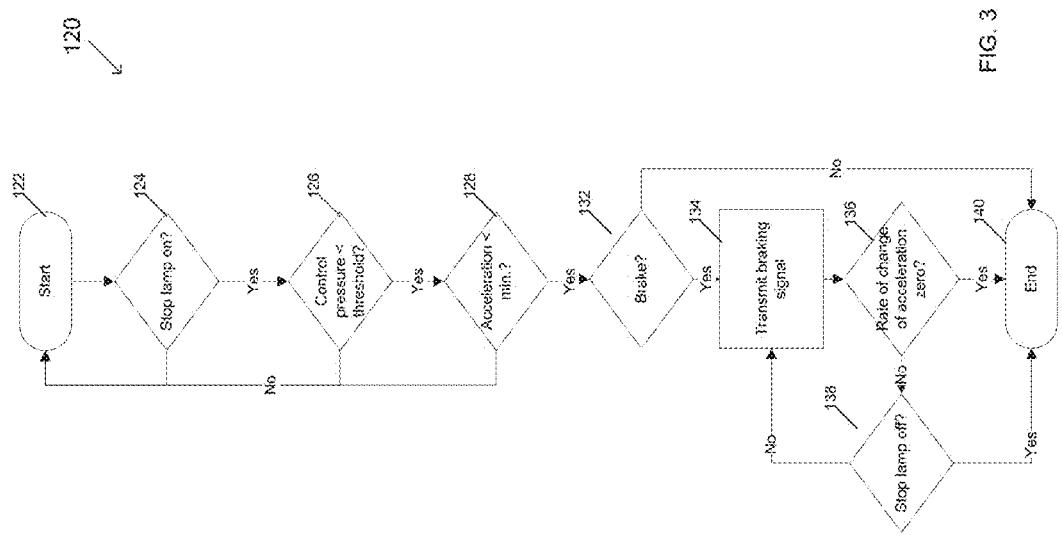

METHOD, SYSTEM AND CONTROLLER FOR DETERMINING WHETHER TO BRAKE A TRAILER

BACKGROUND

The present invention relates to embodiments of a method, system and controller for determining whether to brake a trailer in the absence of an air signal on a pneumatic control line. A trailer that is part of an air braked tractor-trailer combination generally receives a service brake demand signal via the pneumatic control line between the tractor and trailer. However, a typical trailer controller cannot determine if there is a problem in the pneumatic control line that may prevent the driver actuated brake demand from reaching the trailer. One problem that may cause this issue is if the driver has forgotten to connect the gladhands, which are pneumatic connectors used to join the tractor pneumatic control line to the trailer pneumatic control line. Another problem may be a loss of the connection of the gladhands between the tractor and trailer during operation of the vehicle or an obstruction in the tractor or trailer pneumatic control lines. Another problem may be a broken or leaking pneumatic control line. If the driver applies the service brakes in the tractor and the trailer service brakes do not apply due to one of the aforementioned issues, the vehicle may not decelerate at the rate expected by the driver and the stability of the vehicle combination may be affected.

A brake-by-wire system, also known as electronic braking, transmits an electronic control signal indicative of the driver's brake demand from the tractor directly to the trailer and may be in addition to the air signal on the pneumatic control line. In one embodiment, the tractor and trailer communicate information, such as brake demand, between themselves over a serial communications bus, such as SAE J1939. However, typical tractor-trailer combination vehicles in the United States are not equipped with a brake-by-wire system. In addition, the tractor and trailer do not share a serial communications bus connection, even if the trailer is equipped with an anti-lock brake or stability system controller. Therefore, these trailers do not have a redundant method of receiving a brake demand signal if there is a problem with the air signal on the pneumatic control line. If there is no air signal received on the pneumatic control line, the trailer service brakes will not be applied. Therefore, there is a need for a system to determine whether to brake the trailer in a situation when there is a driver brake demand from the tractor, but the trailer does not receive the brake demand pneumatically.

SUMMARY

Various embodiments of a controller for a trailer service brake system that determines whether to brake the trailer are disclosed. In accordance with one example, the controller includes an input for receiving a stop lamp signal from an associated tractor, an input for receiving a control line pressure signal of the trailer, a control output for transmitting a braking control signal and control logic. The control logic is capable of receiving the stop lamp signal, receiving the control line pressure signal and determining whether to transmit the braking control signal to brake the trailer in response to the stop lamp signal and the control line pressure signal. In another example, the controller includes at least one input for receiving wheel speed signals and the control logic is further capable of monitoring the wheel speed signals, determining a rate of change of acceleration of the trailer based on the wheel speed signals and transmitting the braking control signal to maintain the rate of change of the acceleration at about zero In accordance with another aspect, a system for determining whether to actuate the service brakes on a trailer comprises a pressure sensor for sensing a control line pressure, an electropneumatic device for delivering braking pressure to the trailer service brake system and a controller. The controller comprises an input for receiving a stop lamp signal from an associated tractor, an input for receiving the control line pressure signal from the pressure sensor, a control output for transmitting a braking control signal to the electropneumatic device and control logic. The control logic is capable of receiving the stop lamp signal, receiving the control line pressure signal and determining whether to transmit the braking control signal to brake the trailer in response to the stop lamp signal and the control line pressure signal.

In accordance with another example, a method for determining whether to actuate the service brakes of a trailer comprises receiving a stop lamp signal, receiving a control line pressure signal and determining whether to transmit a braking control signal to the service brakes of the trailer in response to the stop lamp signal and the control line pressure signal. In another example, the method also includes receiving a signal indicative of a trailer suspension pressure and transmitting the braking control signal in response to the stop lamp signal indicating the stop lamp is on, the control line pressure signal indicating the control line pressure is less than a stop lamp pressure threshold and the trailer suspension pressure is greater than a trailer suspension pressure threshold.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 3 illustrates a method of determining whether to brake the trailer, according to another embodiment of the present invention.

DETAILED DESCRIPTION

Figure 1:
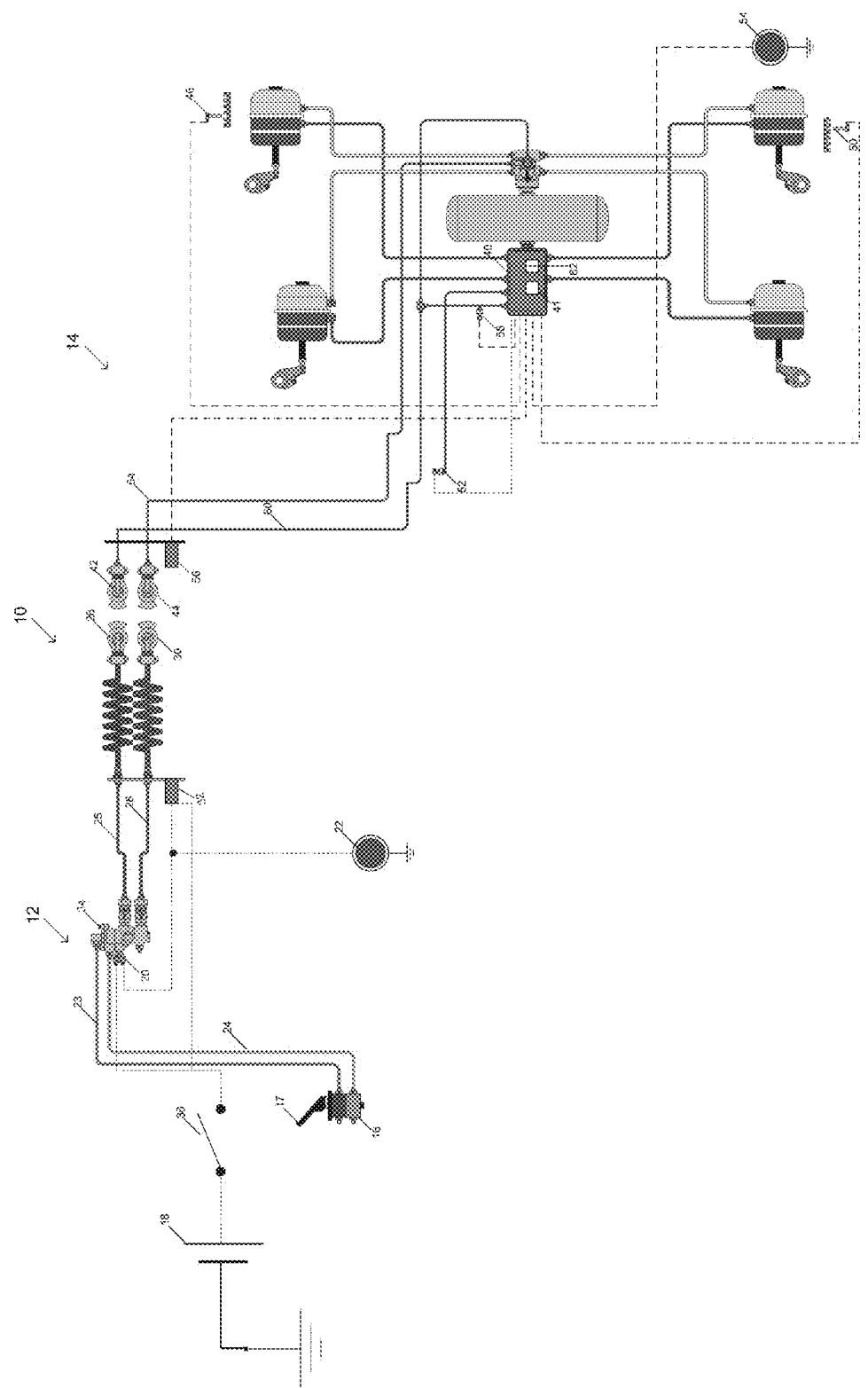
FIG. 1 illustrates a schematic representation of a tractor-trailer vehicle equipped with a controller and system according to an embodiment of the present invention.

With reference to FIG. 1, a vehicle 10 with a tractor portion 12 and a trailer portion 14 is illustrated, according to an example of the present invention. The tractor portion 12 can be any powered unit configured to tow a trailer.

The tractor portion 12 of vehicle 10 includes a brake valve 16. The driver of the vehicle 10 depresses a pedal 17 on the brake valve 16 when he wants to slow down or stop the vehicle 10. The brake valve 16 receives a source of supply air (not shown). When the driver depresses the pedal 17 on the brake valve 16, a path for the supply air is created through the brake valve 16 to primary tractor control line 23 and the secondary tractor control line 24. The tractor portion 12 may be equipped with a hand controlled trailer brake valve (not shown), such as a TC-7™ trailer control brake valve from Bendix Commercial Vehicle Systems LLC. When the driver rotates the handle on the trailer brake valve, a path for supply air is created through the hand control valve through another control line (not shown), which is in communication with a pneumatic valve 34.

The tractor portion 12 of the vehicle 10 includes a battery 18. The battery 18, or battery pack, powers the entire vehicle 10. An ignition switch 36 is connected to the battery 18. The ignition switch 36 closes when the driver activates the ignition.

The tractor portion 12 of the vehicle 10 includes a pneumatic valve 34. The pneumatic valve may be a TP-3™ tractor protection valve from Bendix Commercial Vehicle Systems LLC. The pneumatic valve 34 is pneumatically connected to the primary tractor control line 23 and the secondary tractor control line 24. The pneumatic valve 34 passes the greatest pressure from the primary control line 23, secondary control line 24 or the hand control valve to a trailer service control line 25. The pneumatic valve 34 may have a stop lamp switch 20 mechanically attached, as shown in FIG. 1, which is pneumatically communicating with the trailer service control line 25. Alternatively, the stop lamp switch 20 may be a stand alone switch. For example, the stop lamp switch may be a SL-4™ stop light switch from Bendix Commercial Vehicle Systems LLC. The stop lamp switch 20 is electrically connected to the ignition switch 36 and a stop lamp 22. An electrical connection is made in the stop lamp switch 20 whenever the pressure received by the stop lamp switch 20 is equal to or greater than a stop lamp pressure threshold. Therefore, the stop lamp 22 is on whenever the driver depresses the pedal 17 of the brake valve 16 and the stop lamp pressure threshold is met or exceeded. In one example, the stop lamp pressure threshold is about six pounds per square inch (6 psi).

The tractor portion 12 of the vehicle 10 includes a tractor control line gladhand connector 26 and a tractor supply line gladhand connector 30. The tractor control line gladhand connector 26 receives air when the trailer service control line 25 is pressurized. The tractor supply line gladhand connector 30 receives air from a tractor supply line 28, which is normally pressurized by the tractor supply tanks (not shown). The tractor portion 12 also includes an electrical connector 32, which includes at least a line for power via the ignition switch 36 and a line for a stop lamp signal. In the example as shown in FIG. 1, the stop lamp signal is an on or off signal transmitted from the stop lamp switch 20. An on signal is transmitted to the electrical connector 32 via the stop lamp switch 20 whenever the driver depresses the pedal 17 of the brake valve 16 and the stop lamp pressure threshold is met or exceeded. Alternatively, the stop lamp signal can be generated by another controller that transmits or receives brake control information, such as a stability controller.

The trailer portion 14 of vehicle 10 includes a trailer control line gladhand connector 42, which is configured to mate with the tractor control line gladhand connector 26. The trailer portion 14 also includes a trailer supply line gladhand connector 44, which is configured to mate with the tractor supply line gladhand connector 30. The trailer portion 14 includes an electrical connector 56 configured to mate with tractor electrical connector 32. The driver will connect each of the connectors; tractor control line gladhand connector 26 with the trailer control line gladhand connector 42, tractor supply line gladhand connector 30 with trailer supply line gladhand connector 44 and tractor electrical connector 32 with trailer electrical connector 56, when mating a trailer portion 14 to the tractor portion 12. If the tractor control line gladhand connector 26 is not mated properly with the trailer control line gladhand connector 42, the trailer portion 14 will not receive a control line pressure signal from the tractor portion 12.

In the trailer portion 14, the trailer control line gladhand connector 42 is pneumatically connected with the trailer control line 60. The trailer supply line gladhand connector 44 is pneumatically connected to the trailer supply line 64.

The trailer portion 14 includes at least two wheel speed sensors 46, 50 with one being at each wheel end of the trailer portion 14 as shown in FIG. 1. The trailer portion 14 may include more than two wheel speed sensors when there are more than two wheel ends on the trailer.

The trailer portion 14 may include a trailer suspension pressure sensor 52. The trailer suspension pressure sensor is pneumatically connected to the trailer air suspension (not shown) and may be used to estimate the mass of the trailer portion 14. The trailer suspension pressure sensor 52 may be integrated with a trailer controller 40 or may be stand alone. The trailer portion 14 also includes a stop lamp 54 that will be on when the trailer service brakes are actuated.

The trailer portion 14 includes a trailer controller 40. The trailer controller 40 can be a stand-alone controller or include functionality for performing antilock braking or stability control. The trailer controller 40 is electrically connected to the trailer electrical connector 56 for receiving ignition power and a stop lamp signal. The stop lamp signal may be generated by the stop lamp switch 20 or from another controller on the tractor portion 12. The trailer controller 40 is electrically connected to a control line pressure sensor 58 for receiving a signal indicative of the pressure in the trailer control line 60. The control line pressure sensor 58 may be integrated with the trailer controller 40 or may be a stand alone sensor. The trailer controller 40 is electrically connected to the wheel speed sensors 46, 50.

The trailer controller 40 is electrically connected to an electro-pneumatic device 62. The electro-pneumatic device 62 communicates pneumatically with the trailer supply line 64 and the service braking components at each wheel end to actuate service braking on the trailer portion 14 when the electropneumatic device 62 receives a braking control signal from the trailer controller 40. The electropneumatic device 62 may be integrated with the trailer controller 40 or may be a stand alone device.

The trailer controller 40 includes control logic 41 for determining whether to brake the trailer portion 14. The control logic 41 is capable of determining an acceleration and a rate of change of acceleration based on the signals from the wheel speed sensors 46, 50. The control logic 41 may also receive vehicle speed information from another source on the trailer portion 14, such as a radar. The rate of change of acceleration, also known as "jerk", is the second derivative of speed. The control logic 41 may also control anti-lock braking or stability control functions. The control logic 41 may include volatile memory, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 41.

Accordingly, the trailer controller includes an input for receiving a stop lamp signal from an associated tractor, an input for receiving a control line pressure signal of the trailer, a control output for transmitting a braking control signal and control logic. The control logic is capable of receiving the stop lamp signal, receiving the control line pressure signal and determining whether to transmit the braking control signal to brake the trailer in response to the stop lamp signal and the control line pressure signal.

Accordingly, a system for determining whether to actuate the service brakes on a trailer comprises a control line pressure sensor for sensing a control line pressure, an electropneumatic device for delivering braking pressure to the trailer service brake system and a controller. The controller comprises an input for receiving a stop lamp signal from an associated tractor, an input for receiving the control line pressure signal from the pressure sensor, a control output for transmitting a braking control signal to the electropneumatic device and control logic. The control logic is capable of receiving the stop lamp signal, receiving the control line pressure signal and determining whether to transmit the braking control signal to brake the trailer in response to the stop lamp signal and the control line pressure signal.

Figure 2:
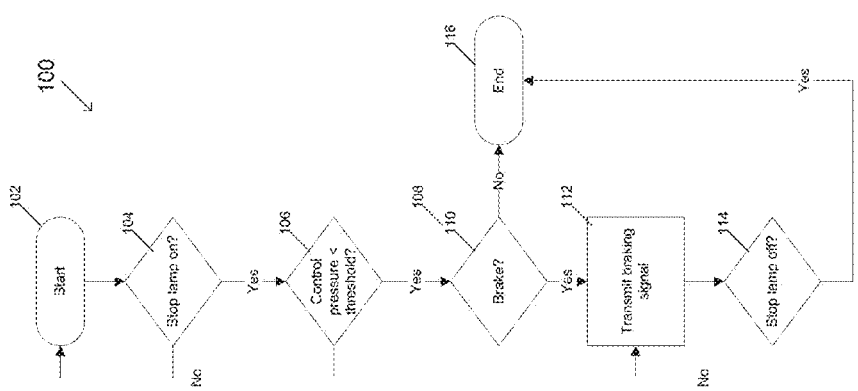
FIG. 2 illustrates a method of determining whether to brake the trailer, according to an embodiment of the present invention.

A series of flowcharts for implementing methods of determining whether to actuate the service brakes of the trailer according to examples of the present invention are shown in FIGS. 2 and 3.

A flowchart for implementing a method 100 of the present invention is shown in FIG. 2. The method 100 begins at step 102. In step 104, the control logic 41 determines whether the stop lamp 22 of the tractor portion 12 is on by receiving the stop lamp signal from the trailer electrical connector 56. If the stop lamp signal is off, the method 100 returns to step 102. If the stop lamp signal is on, the method proceeds to step 106.

In step 106, the control logic 41 determines if the control pressure signal from the pressure sensor 58 is less than a stop lamp pressure threshold. If the control pressure is greater than or equal to the stop lamp pressure threshold, the method returns to step 102. When the control pressure is greater than or equal to the stop lamp pressure threshold, the control pressure created when the driver depresses the brake pedal 17 is being received by the trailer portion 14. If the control pressure is less than the stop lamp pressure threshold, the method continues to step 108. In one example the stop lamp pressure threshold is between about four pounds per square inch (4 psi) and about eight psi (8 psi). In another example, the stop lamp pressure threshold is about six psi (6 psi). If the control pressure is less than the stop lamp pressure threshold, there is likely no control pressure being received by the trailer portion 14 at the trailer control line gladhand connector 42. Some causes may be a poor connection or open line.

In step 110, the control logic determines whether to brake the trailer based on the stop lamp signal and the control line pressure signal. If the control logic 41 determines to brake the trailer in response to the stop lamp being on and the control line pressure signal indicating the control line pressure is less than the stop lamp pressure threshold, the control logic transmits a braking control signal to the electropneumatic device 62 in step 112. The braking control signal may be transmitted in a manner so the electropneumatic device 62 delivers service brake pressure to alternately apply, hold and release the service brakes at each wheel end. In this manner, the driver may feel the pulsing of the trailer service brakes, thereby bringing his attention to the trailer service brakes. In addition, alternately applying, holding and releasing the service brakes gradually builds the service braking pressure to a predetermined braking pressure. In one example, the predetermined braking pressure is about twenty psi (20 psi). In another example, the predetermined braking pressure is about 30% of the supply pressure available at the electropnuematic device 62.

The stop lamp state is determined again in step 114, such that as long as the stop lamp is on, the braking control signal will be transmitted in step 112. If the stop lamp is off in step 114, the method 100 discontinues transmitting the braking control signal and ends in step 116. All service brake pressure delivered by the electropneumatic device 62 is released to atmosphere when the stop lamp signal is discontinued. The release of the service brake pressure at the wheel ends when the stop lamp signal is off ensures that any calculation error in the control logic 41 would not cause the service brakes to remain applied after the driver has released the brake pedal 17.

If the control logic 41 determines not to brake the trailer in step 110, the method 100 ends in step 116.

Accordingly, a method for determining whether to actuate the service brakes of a trailer comprises receiving a stop lamp signal, receiving a control line pressure signal and determining whether to transmit a braking control signal to the service brakes of the trailer in response to the stop lamp signal and the control line pressure signal.

In FIG. 3, another method 120 to determine whether to brake the trailer is shown. The method 120 starts in step 122. In step 124, the control logic 41 determines whether the stop lamp 22 of the tractor portion 12 is on by receiving the stop lamp signal from the trailer electrical connector 56. If the stop lamp signal is off, the method 120 returns to step 122. If the stop lamp signal is on, the method proceeds to step 126.

In step 126, the control logic 41 determines if the control pressure signal from the pressure sensor 58 is less than a stop lamp pressure threshold. If the control pressure is greater than or equal to a stop lamp pressure threshold, the method returns to step 122. If the control pressure is less than the stop lamp pressure threshold, the method continues to step 128. In one example the stop lamp pressure threshold is between about four psi (4 psi) and about eight psi (8 psi). In another example, the stop lamp pressure threshold is about six psi (6 psi).

In step 128, the control logic 41 determines if the acceleration of the trailer portion 14 is less than a minimum acceleration. The acceleration may be determined by the control logic 41 from the signals from the wheel speed sensors 46, 50 or from another source. If the acceleration is greater than or equal to the minimum acceleration threshold, the method 120 returns to step 122. If the acceleration is less than a minimum acceleration threshold, the method 120 continues to step 130. The minimum acceleration threshold is between about −0.1 g and about −0.3 g. In another example, the minimum acceleration threshold is about −0.2 g.

In step 132, the control logic 41 determines whether to brake the trailer based on the stop lamp signal, the control line pressure signal and the acceleration of the trailer. If the control logic 41 determines not to brake the trailer, the method 120 ends at step 140. If the control logic 41 determines to brake the trailer in response to the stop lamp signal being on, the control line pressure signal indicating the control line pressure is less than the stop lamp pressure threshold and the acceleration being less than a minimum acceleration threshold, the method continues to step 134. In step 134, the control logic transmits a braking control signal to the electropneumatic device 60.

The method 120 then continues to step 136 to determine if the rate of change of the acceleration of the trailer is zero or near zero based on the wheel speed signals. The closer the rate of change of acceleration on the trailer portion 14 is to zero, the more likely the deceleration of the vehicle 10 is mirroring the deceleration desired by the driver. If the rate of change of acceleration is at or nearly zero, the method 120 ends at step 140 and the service braking is discontinued. If the rate of change is less than or greater than zero, the method 120 continues to step 138 to determine the stop lamp state. If the stop lamp signal is on, the method returns to step 134 to continue to transmit the braking signal. Braking can be effectuated by a single braking control signal to the electropneumatic device 60 or the control logic 41 may alternately apply, hold and release the electropneumatic device 60 in order to brake the trailer in a graduated manner. In one example, the braking control signal would be transmitted in a manner to apply service pressure to a predetermined pressure level. In another example, the braking control signal would be transmitted in a manner to apply a service brake pressure proportionate to the acceleration. The braking can also be effectuated in this manner to keep the rate of change of acceleration as close to zero as possible. If the stop lamp signal is off, indicating the driver has released the tractor service brakes, the method ends at step 140 and all service brake pressure is released by the electropneumatic device 62.

In another example, the method 100 will use information regarding the mass of the trailer, estimated from the value of the signal from the trailer suspension pressure sensor 52, in step 108 to determine whether to brake the trailer. In another example, the method 120 will use information regarding the mass of the trailer in step 130 to determine whether to brake the trailer. The control logic 41 will transmit the braking control signal in response to the stop lamp signal indicating the stop lamp is on, the control line pressure signal indicating the control line pressure is less than a stop lamp pressure threshold and the trailer suspension pressure being greater than a trailer suspension pressure threshold. In one example, the trailer suspension pressure threshold is to be a value indicative of about 130% of a value indicative of an unloaded trailer.

In another example, the method 100 will transmit the braking control signal in step 112 within a predetermined time period from receiving the stop lamp signal indicating the stop lamp is on as in step 104. The predetermined time period is between about thirty (30) seconds and about ninety (90) seconds. By ensuring the transmission of the braking signal takes place within the predetermined time period, the driver is less likely to excessively depress on the brake pedal 17 to achieve greater deceleration due to only the tractor service brakes being activated. If the driver depresses the brake pedal 17 with great force, then there is an opportunity for excessive air to be vented through the tractor control line if there is a break between the tractor control line gladhand connector 26 and the trailer control line gladhand connector 44. With excessive braking, the tractor supply line will be quickly depleted and the electropneumatic device 34 will discontinue the supply of air through the tractor supply line 28 in response, causing the trailer spring brakes to apply because the supply air received in the trailer supply line 64 drops below a supply pressure threshold. In one example, the supply pressure threshold is about forty-five (45) psi.

In another example, method 100 will not be implemented in response to the control line pressure signal from the control line pressure sensor 58 being greater than or equal to the stop lamp pressure threshold within a predetermined time period prior to receiving the stop lamp signal indicating the stop lamp is on as in step 104 and the control line pressure signal indicating the control line pressure is less than the stop lamp pressure threshold as in step 106. The control logic 41 will determine not to autonomously brake the trailer in step 108, as the control logic 41 recognizes that since the control line pressure signal had been transmitted within the predetermined time period, the absence of the control line pressure signal in this instance is likely due to a reason not associated with the loss of the control line connection between the tractor portion 12 and the trailer portion 14. One reason that the control line pressure signal may not be received by trailer portion 14 is that the tractor controller has automatically applied the brakes in the tractor to achieve stability, but the tractor controller may not require braking in the trailer to achieve stability. In one example, the predetermined time period is between about thirty (30) seconds and about (90) ninety seconds.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a trailer service brake system comprising:

An input for receiving a stop lamp signal from an associated tractor;

An input for receiving a control line pressure signal of the trailer;

A control output for transmitting a braking control signal; and

Control logic capable of:
   receiving the stop lamp signal, wherein the stop lamp signal is on in response to a driver depressing the brake pedal on the associated tractor to achieve a brake pressure greater than or equal to a stop lamp pressure threshold;
   receiving the control line pressure signal;
   transmitting the braking control signal in response to the stop lamp signal indicating the stop lamp is on and the control line pressure signal indicating the control line pressure is less than the stop lamp pressure threshold; and
   determining not to transmit the braking control signal in response to the control line pressure being greater than or equal to the stop lamp pressure threshold within a predetermined time period prior to receiving the stop lamp signal indicating the stop lamp is on and the control line pressure signal indicating the control line pressure is less than the stop lamp pressure threshold.

2. The controller as in claim 1, wherein the control logic discontinues transmitting the braking control signal in response to the stop lamp signal indicating the stop lamp is off.

3. The controller as in claim 1, wherein the stop lamp pressure threshold is about six pounds per square inch (6 psi).

4. The controller as in claim 1, wherein the control logic is further capable of receiving a signal indicative of a trailer suspension pressure and transmitting the braking control signal in response to the stop lamp signal indicating the stop lamp is on, the control line pressure signal indicating the control line pressure is less than a stop lamp pressure threshold and the trailer suspension pressure indicating the trailer suspension pressure is greater than a trailer suspension pressure threshold.

5. The controller as in claim 1, further comprising: at least one input for receiving wheel speed signals; wherein the control logic is further capable of: monitoring the wheel speed signals; determining a rate of change of acceleration of the trailer based on the wheel speed signals; and transmitting the braking control signal to maintain the rate of change of the acceleration at about zero.

6. The controller as in claim 5, wherein the control logic transmits the braking control signal to alternately apply, hold and release the trailer service brake system to maintain the rate of change of acceleration at about zero.

7. The controller as in claim 1, further comprising: at least one input for receiving wheel speed signals; wherein the control logic is further capable of determining an acceleration of the trailer based on the wheel speed signals and determining not to transmit the braking signal in response to the acceleration of the trailer being greater than or equal to a minimum acceleration.

8. The controller as in claim 7, wherein the minimum acceleration is about −0.2 g.

9. A system for determining whether to brake a trailer comprising:
   A pressure sensor for sensing a control line pressure;
   An electropneumatic device for delivering braking pressure to the trailer service brake system; and
   A controller comprising:
      An input for receiving a stop lamp signal from an associated tractor;
      An input for receiving the control line pressure signal from the pressure sensor;
      A control output for transmitting a braking control signal to the electropneumatic device; and
      Control logic capable of: receiving the stop lamp signal; receiving the control line pressure signal; and not transmitting the braking control signal in response to the control line pressure being greater than or equal to a stop lamp pressure threshold within a predetermined time period prior to receiving the stop lamp signal indicating the stop lamp is on and the control line pressure signal indicating the control line pressure is less than a stop lamp pressure threshold.

10. The system as in claim 9, wherein determining whether to transmit the braking control signal further comprises: transmitting the braking control signal to the electropneumatic device to deliver braking pressure in response to the stop lamp signal indicating the stop lamp is on and the control line pressure signal indicating the control line pressure is less than a stop lamp pressure threshold.

11. The system as in claim 10, wherein the control logic discontinues transmitting the braking control signal to the electropneumatic device in response to the stop lamp signal indicating the stop lamp is off, wherein the braking pressure is exhausted to atmosphere.

12. The system as in claim 9, wherein the controller further comprises: an input for receiving at least one wheel speed signal; wherein the control logic is further capable of determining an acceleration of the trailer based on the at least one wheel speed signal and determining not to transmit the braking signal in response to the acceleration of the trailer being greater than a minimum acceleration.

13. A controller for a trailer service brake system comprising: An input for receiving a stop lamp signal from an associated tractor; An input for receiving a control line pressure signal on the trailer; A control output for transmitting a braking control signal; and Control logic capable of: receiving the stop lamp signal; receiving the control line pressure signal; and determining not to transmit the braking control signal in response to the control line pressure being greater than or equal to a stop lamp pressure threshold within a predetermined time period prior to receiving the stop lamp signal indicating the stop lamp is on and the control line pressure signal indicating the control line pressure is less than the stop lamp pressure threshold.

14. The controller as in claim 13, wherein the stop lamp pressure threshold is about six pounds per square inch (6 psi).

15. The controller as in claim 13, wherein the predetermined time period is between about thirty seconds and about ninety seconds.

16. A method for determining whether to actuate the service brakes of a trailer comprising:
   Receiving a stop lamp signal; wherein the stop lamp signal is on in response to a driver depressing the brake pedal on the associated tractor to achieve a brake pressure greater than or equal to a stop lamp pressure threshold;
   Receiving a control line pressure signal;
   Determining whether to transmit a braking control signal to the service brakes of the trailer in response to the stop lamp signal and the control line pressure signal; wherein determining whether to transmit the braking control signal comprises: transmitting a braking control signal in response to the stop lamp signal indicating the stop lamp is on and the control line pressure signal indicating the control line pressure is less than the stop lamp pressure threshold; and
   determining not to transmit the braking control signal in response to the control line pressure being greater than or equal to the stop lamp pressure threshold within a predetermined time period prior to receiving the stop lamp signal indicating the stop lamp is on and the control line pressure signal indicating the control line pressure is less than the stop lamp pressure threshold.

17. The method as in claim 16, wherein the stop lamp pressure threshold is about six pounds per square inch (6 psi).

18. The method as in claim 16, further comprising transmitting the braking control signal to alternately apply and release the service brakes of the trailer.

19. The method as in claim 18, wherein transmitting the braking control signal to alternately apply and release the service brakes of the trailer builds the service brakes to a predetermined braking pressure.

20. The method as in claim 19, wherein the predetermined braking pressure is about twenty pounds per square inch (20 psi).

21. The method as in claim 16, further comprising discontinuing transmitting the braking control signal in response to the stop lamp signal indicating the stop lamp is off.

22. The method as in claim 16, further comprising receiving a signal indicative of a trailer suspension pressure and transmitting the braking control signal in response to the stop lamp signal indicating the stop lamp is on, the control line pressure signal indicating the control line pressure is less than a stop lamp pressure threshold and the trailer suspension pressure is greater than a trailer suspension pressure threshold.

23. The method as in claim 16, further comprising: receiving at least one wheel speed signal; determining a rate of change of acceleration of the trailer based on the at least one wheel speed signal; and transmitting the braking control signal to maintain the rate of change of acceleration at about zero.

24. The method as in claim 23, further comprising: transmitting the braking control signal to alternately apply and release the service brakes of the trailer to maintain the rate of change of acceleration at about zero.

25. The method as in claim 16, further comprising: Receiving at least one wheel speed signal; determining an acceleration of the trailer based on the at least one wheel speed signal; and determining not to transmit the braking control signal in response to the acceleration of the trailer being greater than a minimum acceleration.

26. The method as in claim 25, wherein the minimum acceleration is about −0.2 g.

27. The method as in claim 16, wherein the stop lamp pressure threshold is about six pounds per square inch (6 psi).

28. The method as in claim 16, wherein the predetermined time period is between about thirty seconds and about ninety seconds.

* * * * *